United States Patent [19]

Kapaan

[11] Patent Number: 4,900,236
[45] Date of Patent: Feb. 13, 1990

[54] CEILING FAN

[75] Inventor: Hendrikus J. Kapaan, Nieuwegein, Netherlands

[73] Assignee: SKF Industrial Trading and Development Co., Nieuwegein, Netherlands

[21] Appl. No.: 165,295

[22] Filed: Mar. 8, 1988

[30] Foreign Application Priority Data

Mar. 11, 1987 [NL] Netherlands ............ 8700586

[51] Int. Cl.$^4$ .................................. F04B 17/02
[52] U.S. Cl. ........................ 417/354; 417/423.12; 416/208
[58] Field of Search ............ 417/352, 353, 354, 423 P; 416/204 R, 207, 208, 248

[56] References Cited

U.S. PATENT DOCUMENTS

| 2,382,535 | 8/1945 | Bauer | 416/207 |
| 3,175,755 | 3/1965 | Rockafield | 417/354 |
| 3,601,507 | 8/1971 | Harris | 417/354 |
| 4,400,140 | 8/1983 | Papst | 417/354 |
| 4,564,335 | 1/1986 | Harmsen et al. | 417/354 X |

FOREIGN PATENT DOCUMENTS 1031929  6/1958  Fed. Rep. of Germany ...... 417/354

Primary Examiner—Carlton R. Croyle
Assistant Examiner—Eugene L. Szczecina, Jr.
Attorney, Agent, or Firm—Eugene E. Renz, Jr.

[57] ABSTRACT

Ceiling fan consisting of a rotatable assembly to which the fan blades are attached and a stationary assembly connected to capable of being connected to a suspension means. These assemblies have a common centerline, and the rotary assembly comprise the rotor and the stationary assembly the stator, located concentrically inside the rotor, of an electric motor. The rotatable assembly is mounted rotatable relative to the stationary assembly by means of a tubular member extending coaxially with the centerline and a shaft located therewithin. Two bearings are located at a distance one above the other and are mounted between the shaft and the tubular member, at least one of which bearings comprises a rolling bearing. The other one of the two bearings comprises a journal bearing.

7 Claims, 2 Drawing Sheets

CEILING FAN

FIELD OF THE INVENTION

The present invention relates to improvements in ceiling fans.

BACKGROUND OF THE INVENTION

Ceiling fans are not new per se. A prior ceiling fan of the type to which the present invention relates is shown in British Patent Application No. 2,073,958. The ceiling fan shown in this British application consists of a rotatable assembly to which the fan blades are attached and a stationary assembly in or capable of being placed in connection with a suspension means. The rotary assembly comprises the rotor and the stationary assembly the stator, located coaxially inside the rotor, of an electric motor, have a common centerline. The rotatable assembly is mounted rotatably relative to the stationary assembly by means of a tubular member extending coaxially with the common centerline and a shaft located therewithin. Two bearings located at a distance one above the other are installed between the shaft and the tubular member. One of the bearings is a rolling bearing.

In the known ceiling fan, the shaft is mounted in the tubular member by means of two rolling bearings, the tubular member being integral with a bottom or end dish belonging to the rotatable assembly, to which the fan blades are attached, and the shaft being connected at the top thereof to the suspension means.

Assembling the known fan from its several parts is a comparatively difficult operation, requiring skilled workers. It has been found to be particularly difficult to install the shaft in the tubular member by means of the two bearings in such manner that they run perfectly coaxial, and to attach the fan blades in the proper locations on the dish. Unless so assembled there will be an imbalance in the fan, with severe wear and a high noise level when the ceiling fan is in operation.

SUMMARY OF THE INVENTION

The object of the invention is to provide a ceiling fan of the type mentioned that can be assembled in a very simple manner and by less skilled labor.

This object is accomplished in that, in the ceiling fan according to the invention, the other one of the two bearings comprises a journal bearing.

Preferably, the tubular member is part of the stationary assembly, and the rotatable assembly is fixed to the shaft, so that the tubular member and the shaft mounted therewithin by means of the bearings constitute a preassembled integral unit whole, the attaching said member to the suspension means, and the shaft protruding at the other end of the tubular member, this projecting portion of the shaft being provided with means for attachment of the rotary assembly to the shaft.

The tubular member-shaft assembly may then be produced in large numbers in a specialized shop and delivered as such to an assembly shop where the several parts of ceiling fans may be assembled together in a simple manner.

Preferably, the stator is placed around the tubular member with a tight fit, so that the stator may be mounted in simple manner as well.

Advantageously, the projecting end of the shaft is provided with a disc-shaped part accommodated in a round recess inside the otherwise known end dish, the end dish being attached to the disc-shaped part by means of at least one fastener, in particular a bolt, whereby the necessary accurate coaxial fixation of the rotatable assembly may likewise be achieved in a simple manner.

At the same time, the end dish may be provided with a plurality of shoulders formed on the inside thereof for attachment of the rotor.

Another feature of the present invention is the particular mounting arrangement for the fan blades to provide a balanced assembly which is easy and economical to manufacture and assemble. To this end a series of circumferentially spaced indentations are provided in the circumferentially extending flange of the end dish and aligned with each indentation the flange is provided with an opening. Hook shaped ends of L-shaped angle brackets engage in the indentations and openings which are clamped together by means of a bolt, the terminal outer ends of the angle brackets forming a gripping means for the fan blades.

By virtue of the opening previously provided in the peripheral flange of the end dish, the locations for the fan blades are accurately determined, so that the correct installation of the fan blades is likewise a comparatively simple operation.

DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
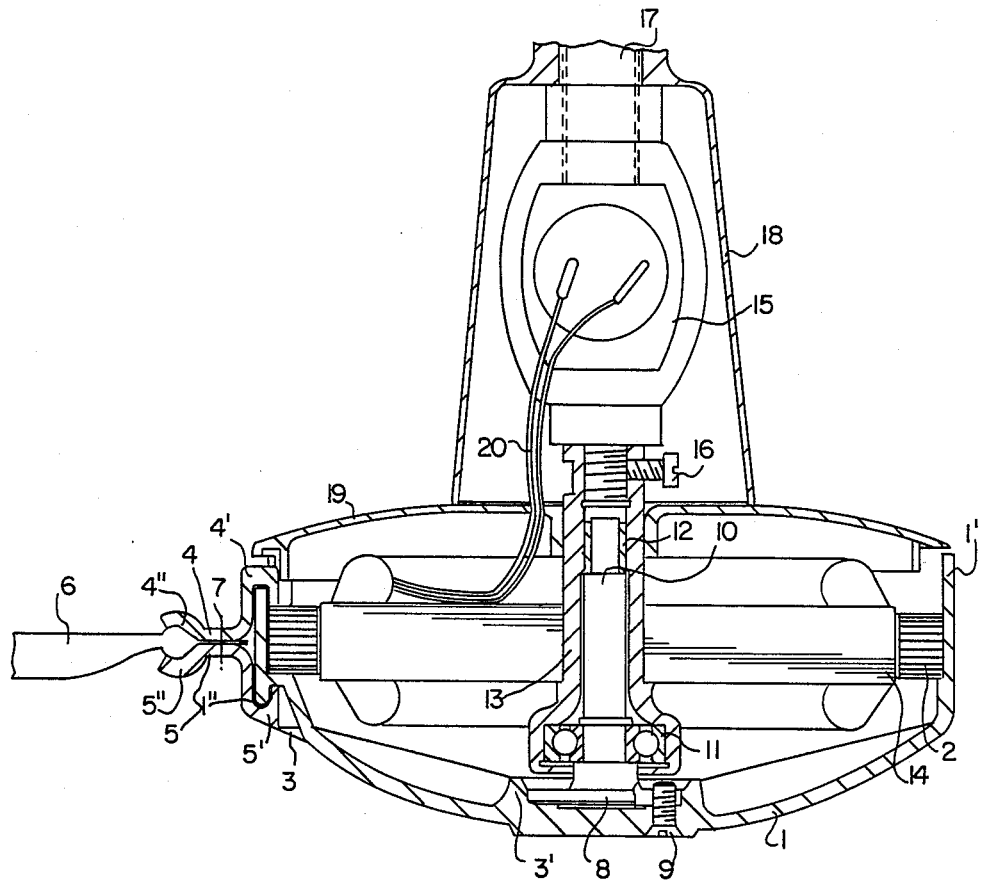
FIGS. 1 and 2 are transverse sectional views of a ceiling fan in accordance with the present invention.

As shown in FIG. 1 of the drawing, the ceiling fan comprises a rotatable assembly consisting of an end dish 1 having an erect peripheral flange 1' and accommodating the rotor 2. The erect flange 1' is locally provided with indentations 3, so that the erect flange 1' has a downward projecting bottom end 1'' at these points. Above each indentation 3, the top end of the erect flange 1' is provided with an opening in which the hook-shaped end 4' of an L-shaped angle 4 engages, which angle 4 cooperates with a bottom L-shaped angle 5 of which the hook-shaped end 5' catches behind the projecting bottom end 1'' of the peripheral flange 1'. The angles 4 and 5 are clamped against each other by means of a bolt 7, while a fan blade 6 is clamped between the other extremities 4'' and 5'' of the angles respectively.

Inside the end dish 1, the projecting annular rim 3' forms a recess accommodating a disc 8, the end dish 1 being attached to said disc 8 by means of screws 9.

The disc 8 is integral with a shaft 10 mounted by means of the ball bearing 11 and the journal bearing 12 in a tubular member 13 so that the shaft 10 can rotate in the tubular member 13. Around the tubular member 13, a stator 14 is tightly fitted. The top of the tubular member 13 is provided with an internal screw thread into which a contact assembly 15 is screwed, a setscrew 16 being provided. The contact assembly 15 is connected at the top to a suspension rod 17.

Around the contact assembly 15, a protective hood 18 is arranged, while a top dish 19 is slipped over the tubular member 13.

Figure 2:
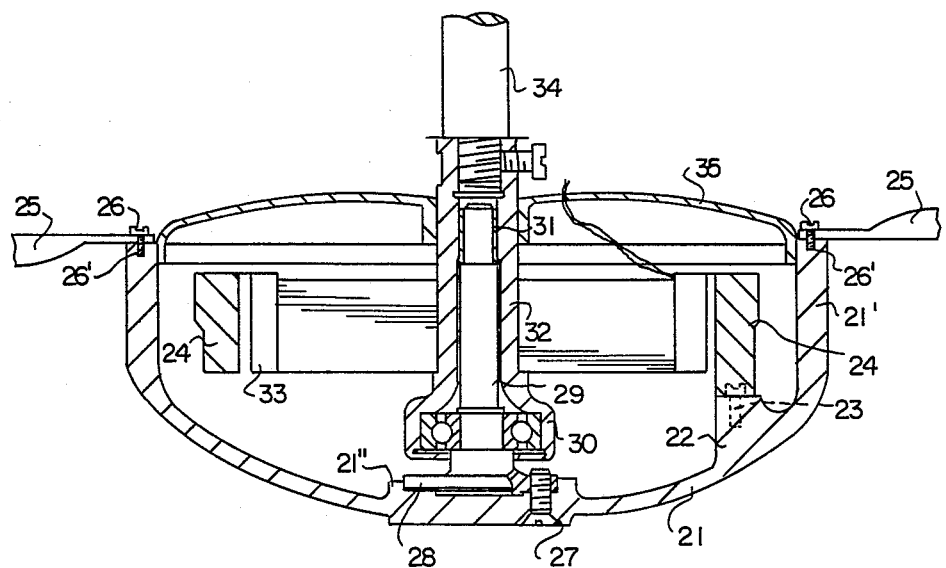

In the embodiment of a ceiling fan according to the invention as shown in FIG. 2 of the drawing, there is likewise an end dish 21 having an erect peripheral flange 21'. In this case, however, said end dish 21 is provided with a plurality of shoulders 22 formed on the inside, to which, by means of screws 23, the rotor 24 is fixed. Besides, in this embodiment, the fan blades 25 are fixed directly to the head flange of the end dish 21 by means of screws 26, these being screwed into threaded holes 26' made in the head flange beforehand in the correct locations.

Otherwise, the embodiment shown in FIG. 2 is like that of FIG. 1. Thus, by means of the projecting annular flange 21'', a cavity is again formed inside the end dish 21, in which, by means of screws 27, a disc 28 is fixed, which disc 28 is integral with a shaft 29 rotatably mounted in a tubular member 32 by means of a ball bearing 30 and a journal bearing 31. Around the tubular member 32, a stator 33 is again tightly fitted, while the top of the tubular member 32 is provided with an internal thread in which a compact assembly as shown in FIG. 1, or a suspension rod 34 directly, may be screwed. Also, there is again a top dish 35 slipped around the tubular member 32.

The shafts 10, 29 shown in FIGS. 1 and 2 may alternatively be hollow shafts, so that the control means in the form of a cord for example may be passed through such a shaft.

In assembling the ceiling fans shown, the starting point is the assembly consisting of the tubular member 13, 32 and the shaft 10, 29 installed therein. First the stator 14, 33 is slipped over the tubular member 13, 32. Then the rotor assembly consisting of rotor 2, 24 and end dish 1, 21 is fixed to disc 8, 20, whereafter the top dish 19, 35 is mounted with a press fit around the tubular member 13, 32. Next, the contact assembly 15 is connected to the tubular member 13, the electrical connections are made using the cords 20, and the protective head 18 put in place. Lastly, the fan blades 6, 25 are attached to the rotatable assembly 1 by means of angles 4 and 5, and/or screws 26.

While particular embodiments of the present invention have been illustrated and described herein, it is not intended to limit the invention and changes and modifications may be made therein within the scope of the following claims.

What is claimed is:

1. Ceiling fan comprising a stationary assembly adapted to be connected to a suspension means and a rotary assembly including a series of fan blades, the rotary assembly including a rotor and the stationary assembly including a stator of an electric motor, a unitary mounting assembly supporting said rotatable assembly relative to the stationary assembly including an elongated tubular member extending coaxially with the common center line of the rotor and stator, a shaft mounted in the tubular member and two spaced bearings located at a distance spaced axially distance from one another between the shaft member and the tubular member, at least one of the bearings comprising a rolling bearing and the other one comprising a journal bearing, a housing including an end dish having a peripheral flange, means defining a series of circumferentially spaced indentations adjacent the lower edge of the flange and a plurality of slotted openings in the upper peripheral edge of the flange aligned with said indentations and hook shaped mounting brackets having portions engaging in said openings and indentations respectively and means for clamping a fan blade between said bracket members.

2. Ceiling fan as claimed in claim 1; wherein said rotatable assembly includes one terminal end of the shaft being provided with a dish-shaped part accommodated in a round hole in the interior of the end dish which is connected to said dish shaped part.

3. Ceiling fan as claimed in claim 1, wherein said end dish is provided with a plurality of shoulders formed on the interior thereof to which said rotor is fastened.

4. Ceiling fan as claimed in claim 1, wherein the rotatable assembly comprises a bottom or end dish provided with a cylindrical erect peripheral flange (1'), at least in the locations of the fan blades (6), passes over by way of an indentation (3) directed inward into the bottom part of the dish (1), so that the projecting lower extremity (1'') of the peripheral flange is formed, while above this indentation (3), an opening is made in the top end of the peripheral flange in which the hook-shaped end (4') of an upper, generally L-shaped angle (4) engages said hook-shaped end (4') cooperating with a lower, essentially identical angle (5), said angle (5') having a hook-shaped end (9') which catches behind said projecting lower extremity (1'') of the peripheral flange (1'), said angles (4, 5) being held against each other by means of a fastener (7), said angles (4, 5) having with the horizontal legs in contact with each other, and a fan blade (6) being clamped between them at their other extremities.

5. Ceiling fan according to claim 1, wherein the stator is mounted on the tubular member with a press fit.

6. Ceiling fan as claimed in claim 1, wherein said rotatable assembly includes a dish shaped housing having a generally circular recess forming an internal pocket and wherein the projecting end of the shaft has a disc shaped projection which seats in the pocket to support the rotary and stationary elements concentrically relative to one another and fastener means for securing the shaft in the pocket.

7. Ceiling fan as claimed in claim 6, wherein the end dish housing is provided with a plurality of shoulders formed on the interior thereof to which the rotor is fastened.

* * * * *